Aug. 4, 1925.
G. E. WOODARD
AUTOMATIC CUT-OFF
1,548,298
Original Filed Oct. 6, 1914
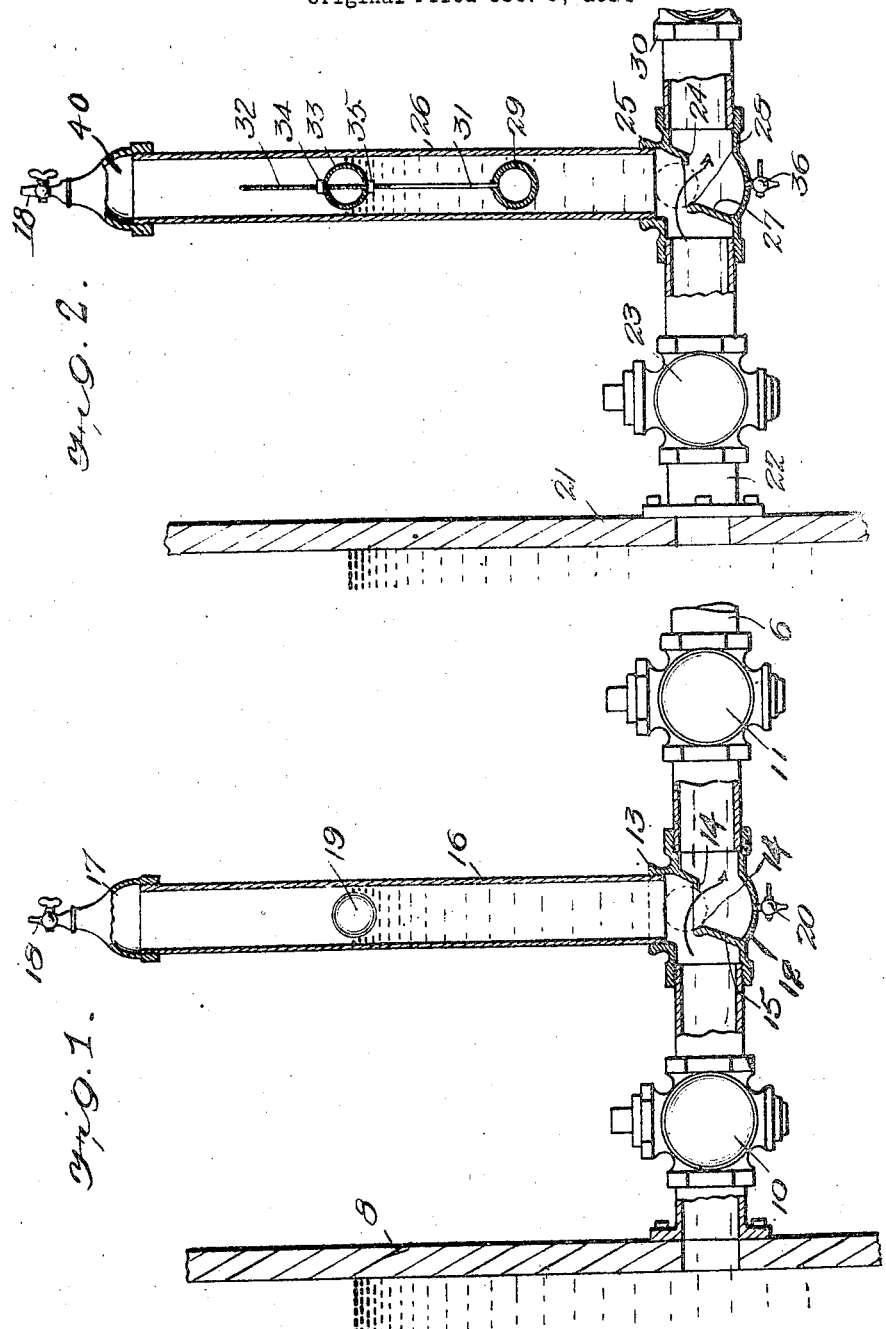
WITNESSES
F. E. Barry
C. E. Travis
INVENTOR
George E. Woodard
BY Munn & Co.
ATTORNEYS Patented Aug. 4, 1925.

1,548,298

UNITED STATES PATENT OFFICE.

GEORGE EDWARD WOODARD, OF NOWATA, OKLAHOMA.

AUTOMATIC CUT-OFF.

Substitute for application Serial No. 865,278, filed October 6, 1924. This application filed May 31, 1921.
Serial No. 474,183.

*To all whom it may concern:*

Be it known that I, GEORGE E. WOODARD, a citizen of the United States, and a resident of Nowata, in the county of Nowata and State of Oklahoma, have invented a new and useful Improvement in Automatic Cut-Offs, of which the following is a specification.

The subject matter of this application is identical with that of my abandoned application Serial No. 865,278 filed October 6, 1914, allowed July 26, 1917.

My invention is an improvement in automatic cut-off valves and has for its object to provide mechanism for use in connection with pumping systems for gathering oil at a central point from many individual tanks, for automatically shutting off the line at or near the tank at a certain predetermined time or when the oil in the tank has reached a certain predetermined depth.

In the drawings:—

Figure 1 is a vertical section through a portion of a tank, and the improved cutting off device, and Figure 2 is a view similar to Figure 1 of a modified construction.

The present invention is designed for use with systems employing a number of tanks 8 and a number of suction lines or pump lines 6.

When a tank is full of oil or whenever for any reason, the owner or his agent desires to sell a tank of oil or a portion of a tank, the purchasing company is notified and a gager is sent to gage the oil in the tank. The gager after gaging unlocks the gate valve on the individual line of the tank and opens the valve so that the oil may pass through the individual line to the gathering line 2 or 3, as the case may be.

After the oil has passed out of the tank, the gager must close the valve and lock and seal the same, or if but a part of the tank is taken, he must gage the remainder after sealing the valve.

The present invention is designed to correct a principal fault in the system, namely, to prevent the entrance of air into the gathering or suction lines. In the ordinary operation, when a tank of oil has passed into the suction line if the gate valve is not at once closed, a two inch pipe line remains open and air rushes in to the line as fast as the pumps at the gathering station can create a vacuum. For this reason it is necessary to have larger pumps and a greater number than would be the case were automatic means provided for shutting the valve.

In Figure 1 the individual line 6, which is connected to the tank 8 has interposed between the same and the tank valve casings 10 and 11, and a T shaped valve casing 12 is arranged between these valve casings. The valve casing 12 has a lateral branch 13, and a valve seat 14 is formed in a diaphragm 15, arranged transversely of the casing.

A pipe or column 16 is connected with the lateral branch 13, and a cover 17 is threaded on to the top of the pipe or column. The cover has an outlet controlled by a valve casing 18, and a ball valve 19 is arranged in the column for cooperating with the seat 14, of the diaphragm 15 to close the communication through the valve casing.

The column 16 is of the same height as the tank, or it is of a height such that the greatest depth that the tank will contain will not be above the top of the column.

A drain valve 20 is arranged in the valve casing 12 at the under part thereof for the purpose of draining the same, and the valve 18 is to permit the escape of air from the column during the filling of the tank. The valves in the casings 10 and 11 are the gate valves operated by the gager to connect and disconnect the tank from the pumping station.

In operation when the gager opens the valves 10 and 11 to connect the tank 8 with the pumping station, he first drains the column 16, and the valve casing 12 by opening the drain valve 20. The valve 18 at the top of the column is also open.

The gager now opens the valve in the casing 10, and permits the oil to pass into the valve casing 12, and the column 16. It will be obvious that the valve 19 will be lifted by the entering oil until the oil in the column has attained the same depth as the oil in the tank. After this has taken place the gager opens the valve in the casing 11, it being understood that the valve 20 is closed before admitting the oil to the column.

It will be evident that as the depth of the oil in the tank decreases, the ball valve 19 will descend until it rests upon the seat 14, thus automatically shutting off the flow of oil from the tank.

With the above-described construction, it will be obvious that the oil will not be shut off until the ball 19 engages the seat 14. It is frequently desirable, however, to shut off the oil before the tank is emptied, and mechanism is provided for this purpose.

In Figure 2, the tank 21 has the outlet pipe 22, which leads to the gathering station, and the gate valve 23 corresponding to the valve 10 of Figure 1, is arranged adjacent to the tank. A valve casing 24 corresponding to the casing 12 of Figure 1 is arranged in the pipe line between the gate valve and the pump. The lateral branch 25 of the valve casing has connected therewith a column 26. The diaphragm 27 of the valve casing 24 is provided with a valve seat 28 for cooperation with a ball valve 29, mounted in a manner to be later described.

The gate valve 30 corresponding to the valve 11, is arranged on the opposite side of the valve casing 24 from the valve 23. The ball valve 29 is secured to the lower end of a stem or rod 31, whose upper end is threaded as shown at 32. A float 33 is mounted on the rod, the float having oppositely arranged openings through which the rod extends, and locking nuts 34 and 35 are threaded on to the rod above and below the float.

By means of the lock nuts the float may be adjusted with respect to the rod 31 at any desired distance from the valve 29, and it will be obvious that any desired amount of oil may be drawn off. As soon however, as the valve 29 engages the seat, the flow will stop.

The valve casing 24 is provided with a drainage valve 36 and the upper end of the column may be provided with a cover 40 having the air valve 18. The seats 14 and 28 are ground true, so that there will be a perfect fit of the ball valve on the seat. The valve acts also as an air trap to trap air that might otherwise reach the pump. It will be obvious that any air in the steam of oil in the pipe 6 will pass upward when it passes the lower end of the column 16 or 26.

I claim:—

1. An automatic cut off for oil tanks comprising a pipe communicating with the tank, a pair of gate valves in said pipe adjacent to the tank, a valve casing between said gate valves, said casing having a transverse diaphragm provided with an opening and a valve seat at the opening, a lateral branch extending upwardly at the valve seat, a column connected with the lateral branch and extending upwardly to the top of the tank, a float valve in said column adapted to cooperate with the seat to stop the flow of oil, said float valve comprising a valve and float, a rod connected with the valve and passing through the float, and lock nuts threaded onto the rod above and below the float, said valve casing having a drainage valve, and a cover for the column provided with a valve controlled air outlet.

2. An automatic cut off for tanks, comprising a pipe communicating with the tank, a pair of valves in said pipe adjacent the tank, a valve casing between said valves, said casing having a transverse diaphragm provided with an opening and a valve seat at the opening, said casing having a lateral branch extending upwardly at the valve seat, a column connected with the lateral branch and extending upwardly to the top of the tank, a float valve in said column adapted to cooperate with the valve seat to stop the flow of liquid from the tank, said float valve comprising a valve and a float, a rod connected with the valve and passing through the float and means for adjusting the float on said rod.

3. An automatic cut off for tanks comprising a pipe communicating with the tank, a pair of valves spaced apart in said pipe and adjacent to the tank, a valve casing between said pair of valves, said casing having a transverse diaphragm provided with an opening and a valve seat at the opening, said casing having a lateral branch extending upwardly at the valve seat, a column connected with said lateral branch and extending upwardly to the top of the tank, a float valve in said column adapted to cooperate with the aforesaid valve seat to stop flow of liquid from the tank, said float valve comprising a valve body, a float and a connecting element between the same, the float adjustably mounted on said connecting element, whereby a predetermined amount of liquid may be drawn off from the tank.

GEORGE EDWARD WOODARD.